United States Patent

Osawa et al.

[11] Patent Number: 5,088,433
[45] Date of Patent: Feb. 18, 1992

[54] WAVE-MAKING RESISTANCE SUPPRESSING MEANS IN SHIP AND SHIP PROVIDED THEREWITH

[76] Inventors: Masakazu Osawa; Hidemori Osawa, both of 34-14, Kameido 9-chome, Koto, Tokyo, Japan

[21] Appl. No.: 560,390

[22] Filed: Jul. 31, 1990

[30] Foreign Application Priority Data

Jul. 31, 1989 [JP] Japan .................... 1-196934
Jul. 31, 1990 [JP] Japan .................... 2-184295

[51] Int. Cl.⁵ ............................................. B63B 1/34
[52] U.S. Cl. ................................ 114/67 R; 114/280; 114/284
[58] Field of Search ............. 114/271, 280, 281, 282, 114/285–287, 67 A, 67 R

[56] References Cited

U.S. PATENT DOCUMENTS

| | | | |
|---|---|---|---|
| 980,964 | 1/1911 | Kalous | 114/67 R |
| 1,682,262 | 8/1928 | Antoni | 114/67 R |
| 1,857,960 | 5/1932 | Johnson | 114/67 R |
| 2,586,218 | 2/1952 | Gazda | 114/67 R |
| 3,041,992 | 7/1962 | Lee | 114/67 R |
| 3,621,803 | 11/1971 | Foster | 114/67 R |
| 3,680,517 | 8/1972 | Morrison | 114/67 A |
| 4,825,795 | 5/1989 | Slemmons | 114/67 R |

FOREIGN PATENT DOCUMENTS 1447 1/1910 United Kingdom .
2776 2/1910 United Kingdom .

Primary Examiner—Joseph F. Peters, Jr.
Assistant Examiner—Clifford T. Bartz
Attorney, Agent, or Firm—Wyatt, Gerber, Burke and Badie

[57] ABSTRACT

The wave making resistance on a proceeding ship can be greatly decreased by providing the ship hull with at least one pair of fins mounted on the hull extending above and below the draft line, each fin being fixed at the front end line and the rear end of the fin outwardly extending making a certain fin-mounting angle of 2 to 25° with the hull surface.

3 Claims, 4 Drawing Sheets

WAVE-MAKING RESISTANCE SUPPRESSING MEANS IN SHIP AND SHIP PROVIDED THEREWITH

BACKGROUND OF THE INVENTION

The present invention relates to a means for suppressing wave making resistance occurring during navigation of a ship as well as to a ship provided with the means. The invention gives quite satisfactory results when it is applied not only to high-speed small- and medium-sized ships but also to large-sized ships such as oil tankers under a requirement for a higher and higher speed.

The resistance occurring when a ship floats and navigates on water consists mainly of frictional resistance with water, wave making resistance and air resistance. While the frictional resistance amounts to almost 90% of the total resistance in a large vessel navigating at a low speed, the contribution of the wave making resistance increases in small or medium vessels navigating at a high speed, sometimes, amounting to 60% of the total resistance. On the other hand, the fraction of resistance due to form resistance and air resistance is only several percent in most ships. Therefore, it is usually undertaken that estimation of the total resistance is made by measuring the total resistance of a model ship, from which the frictional resistance obtained by calculation is subtracted, and the remaining wave making resistance is multiplied by the ratio of displacement of the actual ship to that of the model ship to estimate the wave making resistance of the actual ship to which the frictional resistance is added to obtain the desired total resistance.

The wave making resistance here implied refers to the resistance due to waves, i.e. gravitational waves, caused by the progress of a ship. The ratio of inertia to gravity or the so-called Froude number is an important factor of the wave making resistance.

As a means for decreasing the wave making resistance, it is proposed to decrease the gravity of the ship per se, and for this purpose, hitherto, it was taught in Japanese Patent Publications No. 55-15349, No. 48-35557 and elsewhere to provide the ship hull with a number of air-ejection holes on the bottom or sides near the bottom, from which compressed air is ejected into the sea to cause the hull to float toward the sea surface. This method, however, is hardly applied to actual ships because, except for the vessels navigating while the entire hull is under water, i.e. submarines, having no free surface, generation of waves due to progress of the ship cannot be reduced when the hull is above the sea surface so that the method is ineffective for decreasing the wave making resistance. Moreover, there may be caused a risk of capsizing when the speed of the ship is increased to exceed a certain limit.

Also proposed are a method of bubbling pressurized air into the water forward in the running direction of the ship so as to reduce the water resistance by means of the mass of air bubbles (see, for example, Japanese Patent Kokai No. 60-33185) and a method of decreasing the water resistance by installing thin slender boards in parallel to the outer surface of the hull and approximately at right angle to the running direction, keeping a small clearance with the outer surface of the hull surface in water, and ejecting air from a large number of small openings on the front edge of the board.

These prior art methods, however, require auxiliary facilities such as compressors for pressurizing air to be ejected into water and unavoidable consumption of a very large quantity of energy for ejecting air. Thus, none of the prior art methods is quite satisfactory in application to actual ships.

SUMMARY OF THE INVENTION

The present invention accordingly has an object to provide a means for suppressing the wave making resistance in a simple structure and in high efficiency without consumption of an unduly large quantity of energy.

The inventors, as a result of intensive investigations for developing a means for suppressing wave making resistance of a ship with a device of a simple structure capable of efficiently suppressing the wave making resistance, have arrived at a discovery that the object can be achieved by fixedly providing plate-like or fin-like bodies symmetrically on the right and left side surfaces of the hull spreading above and below the draft line of the hull, each fin-like body being fixed at the front end thereof to the hull and the rear end thereof extending outwardly in a fashion similar to the fin of a fish.

Namely, the invention, completed on the basis of the above mentioned discovery, provides a means for suppression of the wave making resistance in a ship which comprises fixedly installing at least one pair of fins each having a substantially identical form with the others extending above and below the draft line of the ship hull symmetrically on both sides of the hull from the stem to the stern, each fin being fixed to the hull in direct contact along the front end line thereof and the rear end of each fin being spaced apart from the hull surface. The invention also provides a ship provided with the above described means for suppressing wave making resistance of the ship.

DETAILED DESCRIPTION OF THE PREFERRED EMBODIMENTS

Figure 8:
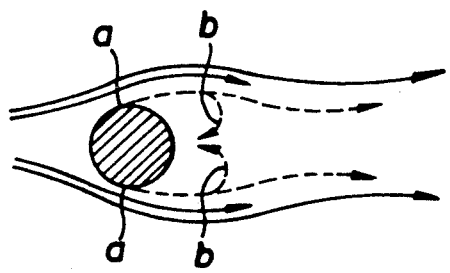
FIG. 8 is an illustration for the explanation of flow lines in general around a body.
Figure 9:
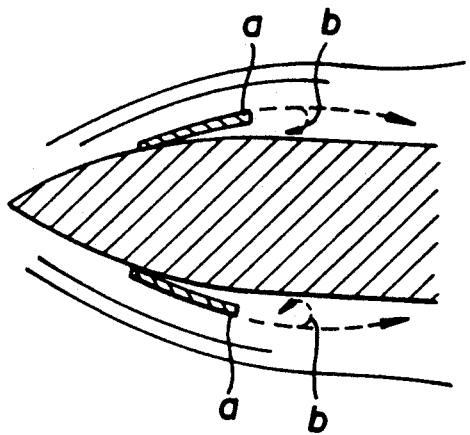
FIG. 9 is an illustration for the explanation of the principle of the inventive means.

As is well known, hydrodynamics teaches that any actual fluid has viscosity and compressivity so that, when a body is put in the flow of a fluid, the viscosity of the fluid causes a velocity distribution due to the wall surface friction, and, as is shown in FIG. 8, break-away portions a and back-wash portions b are formed in the flow line patter around the body. The situation is similar when the fluid is stationary and the body therein is moved. When a pair of fin-like plates are provided extending rearwardly wider apart from the hull, as is shown in FIG. 9, at such a level as to extend above and below the draft line of the hull, accordingly, a break-away portion a is formed in the rear end of each of the plates and back-wash portion b is formed in the space between the rear end of the plate and the hull. As a result, the waves created by the progress of the ship are cancelled as they pass over the rear end of the plate as a result of conversion of the flow into a turbulent flow.

Figure 1:
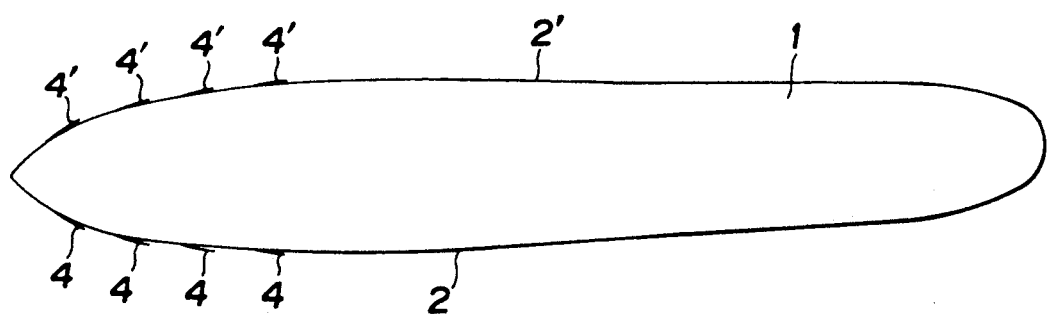
FIG. 1 is a schematic plan view of a ship hull at the draft line level provided with the inventive means.
Figure 2:
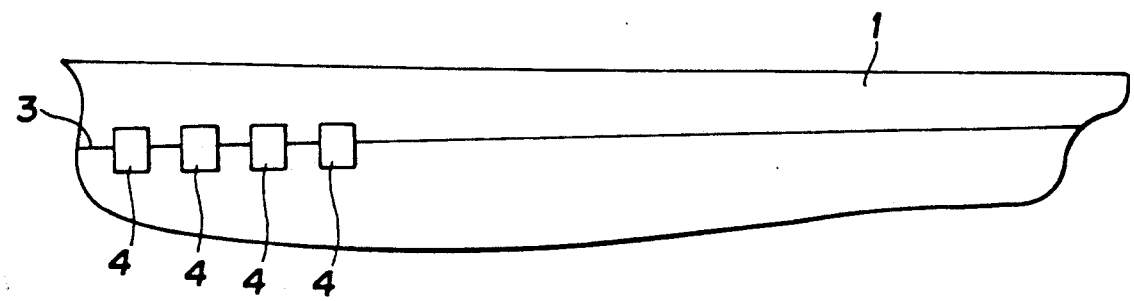
FIG. 2 is a side view of a ship hull provided with the inventive means.
Figure 3A:
FIGS. 3a to 3h each illustrate a fin of different forms used in the invention.
Figure 3B:
Figure 3C:
Figure 3D:
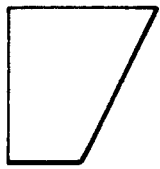
Figure 3E:
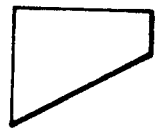
Figure 3F:
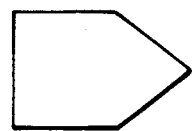
Figure 3G:
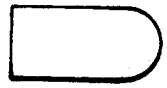
Figure 3H:
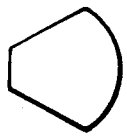

Referring now to the accompanying drawing, the means of the invention is described below in detail. FIG. 1 is a plan view of a ship hull at the draft line level and FIG. 2 is a side view of the hull, in which several pairs of fin-like plates 4,4 ... and 4',4', ... are installed symmetrically on the left and right side walls 2,2', respectively, of the hull 1. As is shown in FIG. 2, each of the plates 4,4, ... and 4',4', ... is installed at a level to extend above and below the draft line 3 from the stem to the stern of the hull 1. Each of the fins 4 ... and 4' ... is, as is illustrated in FIG. 2, fixed to the hull 1 along the front end line while the rear end thereof is isolated from the surface of the hull 1.

It is preferable that each of the fins 4, ... and 4', ... is fixed to the hull 1 in such a disposition as to make an angle of 2° to 25° or, more preferably, 5° to 15° with the surface of the hull 1, which angle is referred to as the mounting angle α hereinbelow. When the mounting angle α is smaller than 2°, the suppressing effect on the wave making resistance is insufficient while, when it is greater than 25°, the frictional resistance is increased so much as to decrease the speed of the ship. When two or more pairs of fins are installed, it is optional that the mounting angle α is varied from pair to pair. The optimum value of the mounting angle α depends on the speed of the ship and profile of the hull 1 so that it is preferable to make a design for each ship on the basis of the results of the water tank experiment using a model hull of the corresponding profile.

The shape of the fins used in the inventive means is not particularly limitative provided that the front end line must have a same curvature as the surface of the hull to which the fin is fixed in direct contact. Examples of suitable fin configurations include squares, vertically elongated rectangles, horizontally elongated rectangles, trapezoids, inverse trapezoids, triangles, pentagons, semicircles and sectors as are illustrated in FIGS. 3a to 3h.

The material of the fins is also not particularly limitative provided that the material has a sufficiently high strength to withstand the resistance of water when the ship is proceeding including metals, plastics, woody materials, ceramics and the like.

Figure 4:
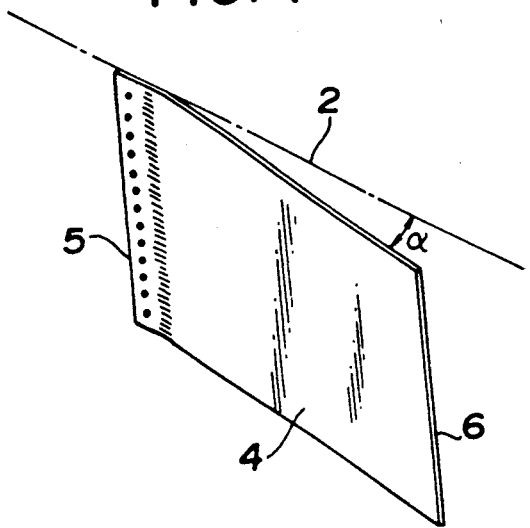
FIGS. 4 to 6 each illustrate a perspective view showing a fin mounted to the ship hull in a different fashion.

The fin is installed, for example, in such a fashion as is shown in FIG. 4 by a perspective view. Namely, a plate 4 is shaped beforehand to have the front end line 5 curved to comply with the curvature of the hull surface and bent in such a way that the rear end 6 thereof comes apart from the hull surface when the fin 4 is fixed to the hull surface at the front end line 5 making an appropriate angle with the hull surface. The front end 5 of the fin is fixed to the surface of the hull 2 by riveting or welding. If necessary, a wedge-shaped spacer may be inserted between the fin 4 and hull 2 in order to ensure stable fixing of the fin.

Figure 5:
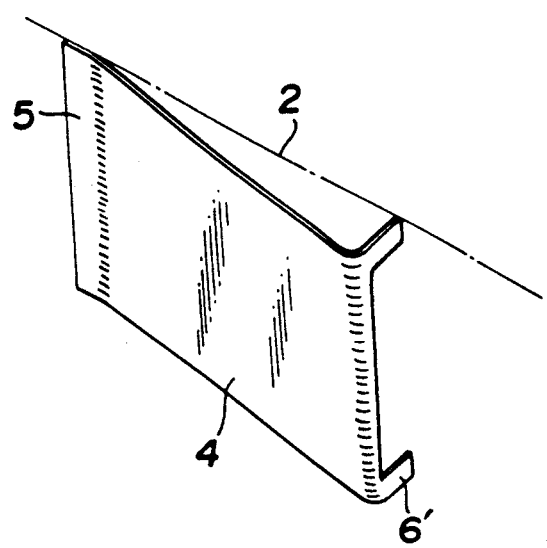

FIG. 5 illustrates a modification of the fin mounting in FIG. 4, in which the rear end portion of the fin plate 4 is bent approximately at right angle to make a bend 6' having a width corresponding to the desired distance of the rear end 6 from the hull 2. The bend 6' is also fixed to the hull 2 by riveting or welding. It is preferable that the bend 6' is fabricated in such a form as to leave the upper and lower portions alone unremoved in the form of legs to facilitate suction of air.

Figure 6:
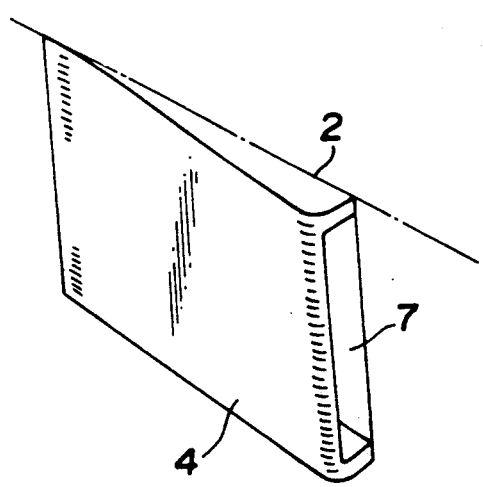

FIG. 6 is a perspective view showing another modification of the fin construction, in which the fin 4 is shaped beforehand as an integral bulged part of the hull 2 to make a pocket 7 opening rearwardly and, optionally, at least in part upwardly and/or downwardly while the pocket 7 is water-tightly isolated from inboard by attaching a plate.

Needless to say, the wave making resistance of a ship varies depending not only on the shape of the hull but also on the wind velocity, velocity and direction of the ocean current, wave height and other surrounding conditions so that it is sometimes desirable that the mounting angle of the fins is modified depending on the circumstances. It is advantageous in such a case that the mounting angle of fins is variable within a certain range.

Figure 7:
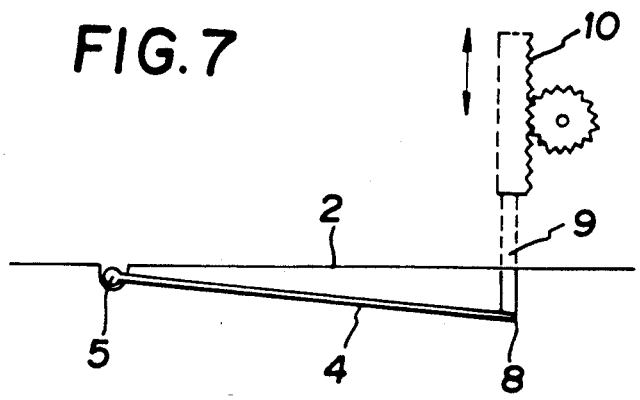
FIG. 7 is a plan view of a fin mounted to the hull with a variable fin mounting angle.

FIG. 7 is a plan view showing a mechanism for such a variable fin mounting angle, in which the front end line 5 of the fin 4 is pivotally supported on the hull 2 so that the rear end 8 is opened and closed by being pushed and pulled by the rod 9 connected to the worm gear mechanism 10. It is of course that the worm gear mechanism 10 can be replaced with a hydraulic cylinder or a cam-and-gear mechanism.

Besides, as for a specific ship, the data concerning the effects of wind velocity, velocity and direction of ocean current, wave height and the like on the wave making resistance are compiled and used for the calculation of the optimum mounting angles and the results are inputted to a computer which serves to automatically control the fin-mounting angle during navigation of the ship in compliance wit the changes in the ambient conditions.

The means of the invention has an effect of greatly decreasing the waves generated by the progress of a ship as a consequence of formation of the break-away portion a on the outer rear end of the fin and the back-wash portion b in the space between the rear end of the fin and the hull as is explained with reference to FIG. 9.

The advantage of the inventive means is particularly great when the ship proceeds at a constant speed in excess of a certain value to reduce the wave making resistance. In addition, the structure of the device used in the inventive means is so simple that the means is applicable to almost all types of conventional ships.

Accordingly, the inventive means can be employed widely in various ships ranging form small vessels such as rowing boats, racing boats, yachts and fishing boats to any large vessels such as cargo boats, passenger boats, container ships and oil tankers.

The invention is described below in further detail by way of example illustrating some embodiments of the invention.

EXAMPLE 1

A tank experiment was conducted in the following manner. Thus, a 2-meter long hull model floating on the water surface in the length-wise direction of a water tank having a length of 10 meters and a width of 5 meters was moored at the front end to about the center position of the 5-meter long wall of the tank with a rope having an interposed tension gauge.

Ten polyvinyl chloride-made fin plates each having dimensions of 100 mm height, 50 mm width and 2 mm thickness were bonded to both side surfaces of the hull symmetrically at positions of 20 cm, 40 cm, 60 cm, 80 cm and 100 cm distances from the front end of the hull in such a fashion that the fin plate fixed to the hull at the front end line thereof extrended above and below the draft line of the hull and the rear end of the fin plate was extending outwardly making a fin-mounting angle of about 3° with the surface of the hull.

In the next place, a water-jet pump of 50 horsepower was operated to generate a water stream in the tank and measurements were made for the relationship between the velocity of the water stream and the load applied to the hull.

For comparison, a similar experiment was conducted in the same hull model without attaching the polyvinyl chloride-made fins. The results obtained are shown in Table 1 below.

TABLE 1

| Water stream velocity, meters/second | Load, kg | |
|---|---|---|
| | No fins | With fins |
| 0 | 0 | 0 |
| 3.0 | 2.5 | 1.4 |
| 3.8 | 2.8 | 1.9 |
| 4.8 | 3.5 | 2.5 |
| 5.4 | 4.7 | 2.6 |
| 6.0 | 6.0 | 2.7 |
| 6.6 | 8.0 | 3.5 |

As is evident from this table, the load applied to the hull could be greatly decreased when the hull was provided with the fins and the resistance-decreasing effect was more remarkable with a larger velocity of the water stream.

It was visually found that the white foaming waves generated at both sides of the hull could be decreased to about a half by providing the hull with the fins.

EXAMPLE 2

The effectiveness of the fins was tested by using an actual boat. Thus, 3-meter long arms were extended from the right and and left boardsides of a motorboat (Model Yamaha SR-21) having an overall length of 6.65 m, overall width of 2.41 m and gross weight of 820 kg and equipped with an outboard engine of 220 horsepower to have a maximum speed of 40 knots. By using 30-meter long tow ropes each knotted to the end of one of the extended arms, two rowing boats (Model Yamaha ROW-10) having an overall length of 2.84 m, overall width of 1.08 m and gross weight of 72 kg were towed and the tension in the tow ropes was measured by means of a tension gauge.

In this case, one of the rowing boats was provided with aluminum-made fins at positions of 1 cm, 37 cm and 70 cm from the stem and 22 cm from the stern symmetrically at the right and left sides. Each fin had dimensions of 10 cm height and 50 cm length and was firmly fixed at the front edge thereof to the side plating of the boat hull with bolts while the rear end of the fin was extended outwardly to be apart from the hull making fin-mounting angles of 11° 33', 8° 13', 7° 29' and 8° 13' from the headmost fin to the rear most fin, respectively.

Table 2 below shows the results of the towing test of these rowing boats by varying the speed.

TABLE 2

| Boat speed, km/hour | Load, kg | |
|---|---|---|
| | No fins | With fins |
| 12 | 7 | 5 |
| 16 | 13 | 9 |
| 20 | 17 | 12 |
| 24 | 20 | 16 |
| 30 | 20 | 10 |

As is clear from this table, the wave-making resistance of the boat provided with fins was substantially smaller than that of the boat without fins irrespective of the speed over the range from low to high speed. This effect was particularly remarkable when the speed of the boat exceeded 30 km/hour.

EXAMPLE 3

With an object to examine the relationship between the fin mounting angle and the wave making resistance, the same experiment as in Example 2 was repeated by installing all of the fins at an identical fin mounting angle. The experiments were conducted with the fin mounting angles of 14.7° and 30°. The results are shown in Table 3 below.

TABLE 3

| Boat speed, km/hour | Load, kg | | |
|---|---|---|---|
| | 14.7° fins | 30° fins | No fins |
| 12 | 1.4 | 2.5 | 2.0 |
| 16 | 4.2 | 7.5 | 6.0 |
| 20 | 5.3 | 12.5 | 7.5 |
| 24 | 8.0 | 14.0 | 10.0 |
| 30 | 6.0 | 17.0 | 12.0 |

As is clear from this table, the resistance on the boat is increased when the fin mounting angle exceeds a certain critical angle which may be about 25° adversely affecting the speed of the boat.

What is claimed is:

1. A means for attachment to a ship for reducing the resistance to motion through water, said means comprising at least one pair of fins each having substantially identical form extending above and below the draft line of the ship hull symmetrically on both sides of the hull from the stem to the stern, each fin being attached to the hull in direct contact therewith along the front end line thereof and the rear end of each fin being spaced apart from the hull surface wherein each fin is pivotally mounted on the hull of the ship along the front end line of said fin, and means for pushing and pulling the rear end of said fin thereby making a variable angle with the hull.

2. A means as claimed in claim 1 wherein each fin is formed integrally with the hull of the ship in the form of a bulge to define rearwardly opening hollow cavity.

3. A means as claimed in claim 1 wherein each fin is supported at the rear end thereof by fixing to the hull of the ship.

* * * * *